United States Patent [19]

Stockton et al.

[11] Patent Number: 5,358,011
[45] Date of Patent: Oct. 25, 1994

[54] OPTICAL FIBRE DUCTS HAVING INNER LAYER SUITED TO BLOWN FIBRE INSTALLATION AND A FIRE RETARDANT OUTER LAYER

[75] Inventors: David J. Stockton; Bates, Roger J., both of Ipswich; Clifford F. Cook, Melton; Philip A. Barker, Ipswich, all of England

[73] Assignee: British Telecommunications public limited company, London, England

[21] Appl. No.: 623,746
[22] PCT Filed: Jul. 4, 1989
[86] PCT No.: PCT/GB89/00780
  § 371 Date: Dec. 19, 1990
  § 102(e) Date: Dec. 19, 1990
[87] PCT Pub. No.: WO90/00823
  PCT Pub. Date: Jan. 25, 1990

[30] Foreign Application Priority Data

Jul. 5, 1988 [GB] United Kingdom ............. 8815977.7

[51] Int. Cl.⁵ ............................................. F16L 57/00
[52] U.S. Cl. ............................ 138/103; 138/110; 138/137; 138/140; 138/177; 138/178; 174/121 A; 385/109; 428/913; 428/921
[58] Field of Search ............. 138/103, 137, 140, 141, 138/177, 178, 108, 110; 174/121 A; 428/920, 921, 913; 74/501 P; 385/101, 109; 156/244.13

[56] References Cited

U.S. PATENT DOCUMENTS

| | | | |
|---|---|---|---|
| 2,122,335 | 6/1938 | Berman et al. | 138/115 |
| 2,301,207 | 11/1942 | Garretson | 156/244.13 |
| 2,624,366 | 1/1953 | Pugh | 138/137 |
| 2,888,954 | 6/1959 | Gates | 138/137 |
| 2,910,094 | 10/1959 | Barnes et al. | 138/115 |
| 2,916,055 | 12/1959 | Brumbach | 138/137 |
| 2,932,323 | 4/1960 | Aries | 138/137 |
| 3,166,688 | 1/1965 | Rowland et al. | 138/103 |
| 3,290,426 | 12/1966 | Barrentine | 138/103 |
| 3,310,447 | 3/1967 | Matthews | 156/244.13 |
| 3,473,087 | 10/1969 | Shade | 138/103 |
| 3,600,487 | 8/1971 | Zavasnik | 138/137 |
| 3,618,614 | 11/1971 | Flynn | 138/137 |
| 3,823,745 | 7/1974 | Schafenacker | 138/103 |
| 3,828,112 | 8/1974 | Johansen et al. | 138/137 |
| 3,950,604 | 4/1976 | Penneck | 138/137 |
| 3,953,270 | 4/1976 | Ford | 156/244.13 |
| 4,099,425 | 7/1978 | Moore | 156/244.13 |
| 4,275,769 | 6/1981 | Cooke | 138/137 |
| 4,451,306 | 5/1984 | Verne | 156/244.13 |
| 4,468,089 | 8/1984 | Brorein | 385/101 |
| 4,513,173 | 4/1985 | Merry | 138/103 |
| 4,575,184 | 3/1986 | Ueno et al. | 385/101 |
| 4,664,472 | 5/1987 | Mayr et al. | 385/109 |
| 4,791,965 | 12/1988 | Wynn | 138/146 |
| 4,796,970 | 1/1989 | Reeve et al. | 385/109 |
| 4,892,442 | 1/1990 | Shoffner | 138/108 |
| 4,936,651 | 6/1990 | Tani | 385/109 |
| 4,952,021 | 8/1990 | Aoki et al. | 385/109 |
| 5,046,815 | 9/1991 | Cain et al. | 385/101 |
| 5,092,161 | 3/1992 | Jenkins | 73/49.5 |

FOREIGN PATENT DOCUMENTS

| | | |
|---|---|---|
| 373737 | 2/1984 | ATX . |
| 0128038 | 12/1984 | |
| 160498 | 11/1985 | European Pat. Off. ............ 138/115 |
| 0160498 | 11/1985 | |
| 0175419 | 3/1986 | |
| 3526823 | 2/1987 | Fed. Rep. of Germany . |
| 2580437 | 10/1986 | France . |
| 2128394 | 4/1984 | United Kingdom . |

Primary Examiner—James E. Bryant, III
Attorney, Agent, or Firm—Nixon & Vanderhye

[57] ABSTRACT

A duct assembly comprises a plurality of ducts longitudinally joined by an interconnecting web. The ducts are preferably arranged in a ribbon format, a single duct in thickness, enabling greater flexibility. The ducts preferably include an inner layer having a bore therethrough and an outer fire retardant layer. A method for manufacturing such a flexible duct is also disclosed.

18 Claims, 1 Drawing Sheet

OPTICAL FIBRE DUCTS HAVING INNER LAYER SUITED TO BLOWN FIBRE INSTALLATION AND A FIRE RETARDANT OUTER LAYER

This invention relates to transmission lines and especially to the ducts in which transmission lines are installed.

Transmission lines are generally installed in ducts both for in-building and external locations. These ducts serve to protect the lines and to route a plurality of lines in an ordered manner. In the case of optical fibre transmission line packages these can be installed in the duct by a process known as fibre blowing in which the package is advanced through the duct by a fluid such as compressed gas. Currently it is customary to provide ducts suitable for blown installations in bundles of seven, with six ducts disposed around a central seventh duct, and for an outer casing to be provided over the bundle. Each duct usually houses a single optical fibre transmission line package. In the event that fewer than seven of the ducts are required they remain empty or a smaller bundle of ducts is provided. Bundles of 1, 2, 4, or 19 ducts are also available. If it is necessary to connect one, or some, of the lines from a bundle to a branch it is necessary to break the outer sheathing and locate the correct duct, which may not always be easily accessible if it is in the middle or far side of the bundle. The breakage of the outer casing can also create problems if it provides fire protection because it is then necessary to reconnect a suitable fire resistant sheathing in the area of the breakout. In practice this means that a breakout connection assembly is required. In order to achieve maximum distances along which fibre package can be blown it is necessary to have a duct that exhibits satisfactory characteristics in terms of internal surface finish and elasticity. For blowing performance slip enhanced medium density polyethylene (MDPE) is preferred although high density polyethylene (HDPE) may also be used. In some instances assemblies such as a bundle of seven ducts are too stiff especially when HDPE is used and also some grades of HDPE suffer from environmental stress cracking and thus are unsatisfactory alone for long term installations.

The present invention is directed towards providing an alternative duct assembly.

Accordingly the present invention provides a duct assembly for transmission lines comprising a tubular member having an inner layer of a material having a suitable inner surface for fibre blowing installation and an outer fire retardant layer.

Preferably the assembly comprises a plurality of said tubular members disposed side by side and longitudinally interconnected by webs to form a ribbon.

A second aspect of the invention provides a duct assembly for transmission lines comprising a plurality of tubular members each tubular member being longitudinally joined to at least one other of the tubular members.

In a preferred embodiment the tubular members each comprise inner and outer layers, and the members are joined by webs formed integrally with the outer layer.

Preferably the outer layer comprises a fire retardant material known as Megolon and the inner layer comprises high density polyethylene, carbon doped high density polyethylene, slip enhanced medium density polyethylene or polyether imide.

A further aspect of the invention provides a method of making a transmission line duct, the method comprising forming an inner layer and extruding an outer layer over the inner layer.

The inner and outer layers may be coextruded or the outer layer may be serially extruded over a previously formed inner layer, preferably in in a single process.

The invention is now described by way of example with reference to the accompanying drawings in which.

Figure 1:
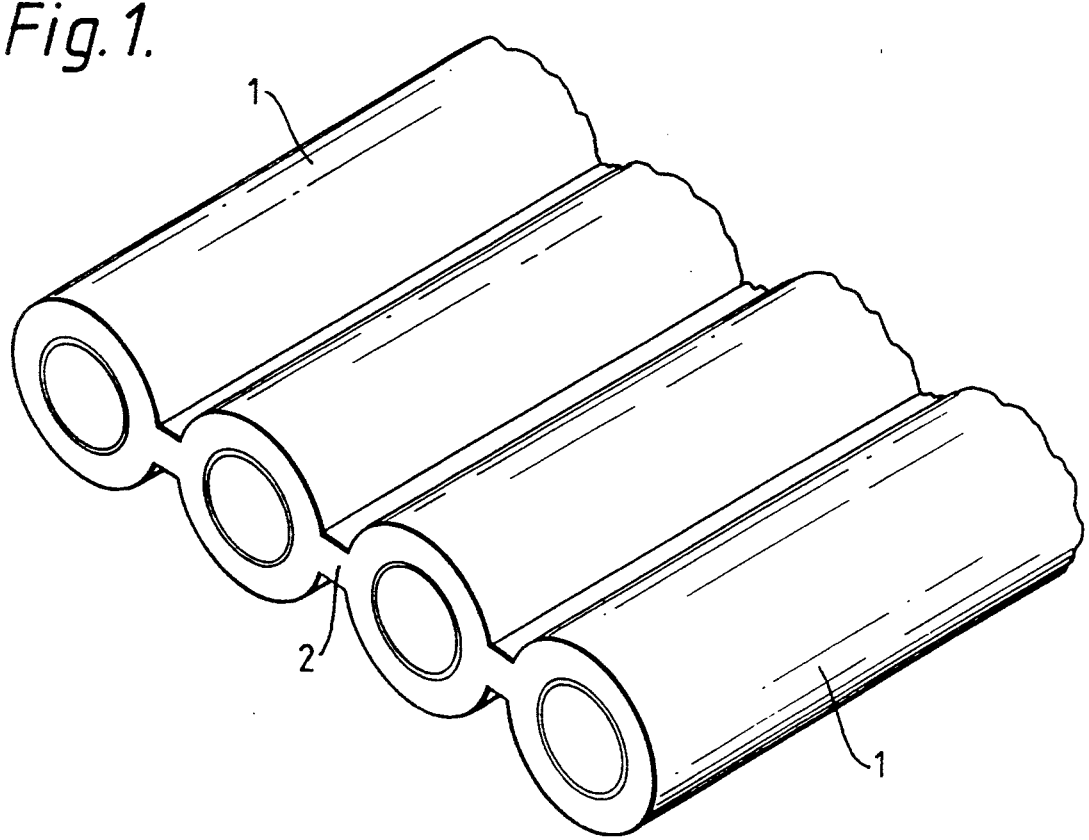
FIG. 1 is an isometric view of a preferred embodiment of the invention.
Figure 2:
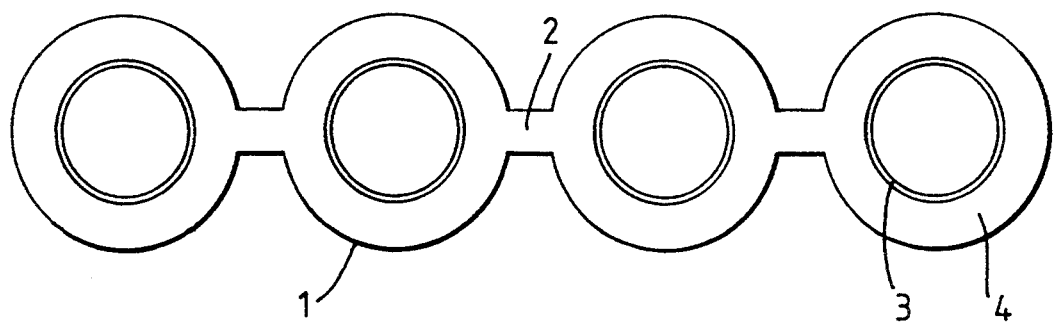
FIG. 2 is a cross sectional view of the embodiment of FIG. 1.

Referring to the drawings a preferred embodiment is shown in which four individual ducts 1 are formed interconnected in a web or ribbon in a single extrusion process. The number and size of the ducts 1 and their spacing may be varied to suit particular applications but the inner diameter of the duct may, for example, be of the order of 3 to 6 mm and the outer diameter of the order of 6 mm to 11 mm, with the interconnecting web 2 having a cross section typically less than 1 mm×1 mm. The web 2 between the ducts 1 may be solid or perforated to aid separation of the individual ducts 1.

Figure 3:
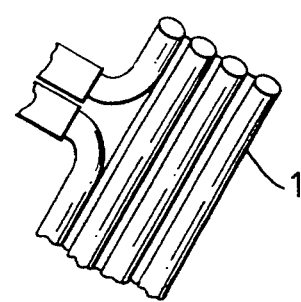
FIG. 3 is an isometric view illustrating a breakout arrangement with an embodiment of the invention.

The ducts are shown as composite ducts having different inner and outer layers, and this is described in more detail layer. Several advantages may be obtained from the linking of ducts into a ribbon. There is no necessity to provide any additional outer sheathing to hold the assembly together and the assembly can be manufactured in a single extrusion process. In the event that fewer ducts are required than are present on the ribbon the unused ducts can be removed by separation along the interconnecting webs 2. If a larger number of ducts is required than is provided by a single ribbon the ribbons will stack together in offset rows, but as each ribbon is only a single duct in thickness flexibility about the single thickness is retained. The improved flexibility of a ribbon rather than bundle means that it is possible to use assemblies where the duct is comparably stiff, for example a plurality of HDPE ducts. If it is desired to access a particular one of the lines within a duct this may be achieved relatively simply by separating the particular duct from its adjacent duct or ducts along the interconnecting web and bending the ducts away from the assembly, as shown in FIG. 3. In this way the integrity of the remaining structure is maintained.

Considering now the particular structure of the preferred embodidment shown in the drawings, each duct 1 comprises an inner layer 3 of HDPE or other suitable material for enabling fibre blowing such as slip enhanced medium density polyethylene (MDPE), typically the inner layer may be 0.25 mm in thickness. Around the inner layer 3 there is an outer layer 4 of a fire retardant material Megolon type S300 although other suitable thermoplastic materials, especially polyolefin based compounds, may be used. Megolon is a modified polyolefin made and sold under that name by Lindsay & Williams Ltd. This layer is typically 1.75 mm–2 mm in thickness. Megolon S300 has been commercially available since April 1987. It is a zero halogen, low smoke, fire retardant compound formed as a blend of polyolefin co-polymers with aluminum trihydrate.

The ribbon of ducts may be fabricated by feeding preformed thin walled HDPE ducts through a die that extrudes the outer layer and interconnecting web over the preformed thin walled ducts. In order to prevent the thin walled ducts from collapsing inwardly it is preferred to pass compressed air along the duct. With this over extrusion process it is not necessary to match closely the melting temperatures of the materials of the two layers and so slip enhanced MDPE may be utilised for the inner tube as well as HDPE, or other suitable materials. The web is preferably formed entirely of the outer layer of the material, but it would also be possible to extrude the outer layer over a ribbon of ducts that were already interconnected. For fire retardant purposes the webs would also need to be coated in the over extrusion process.

A disadvantage of the over extrusion process is that it is relatively slow, typically about 2 meters per minute being the extrusion speed for the overcoating stage. Also there is the initial extrusion stage of the inner thin walled duct so the process is more laborious than a single stage extrusion procedure.

For a single stage extrusion process the melting temperatures of the two layers need to be matched. It was found that using slip enhanced MDPE at the extrusion temperature necessary for co-extrusion with Megolon votalalised the slip agent so that the resulting inner liner did not have a satisfactory surface for fibre blowing installation. It is therefore preferred to utilise HDPE. However the blowing distances obainted with HDPE are generally less than with slip enhanced MDPE. It was found that by incorporating a solid lubricant such as antistatic grade carbon into the HDPE the blowing distances could be increased. A concentration in the range of 5% to 10% carbon is preferred, most preferably 8%. Typical co-extrusion rates are of the order of 10 meters per minute.

A further procedure that has been developed to fabricate the ducts is to extrude both the inner and outer layers in the same apparatus in a series extrusion process in which first the inner duct is extruded and advanced to a second stage die in which the outer layer is extruded over the inner layer. In this procedure the inner layer cools prior to the second state and preferably is subjected to some surface treatment to aid adhesion of the outer layer. The surface treatment may comprise a coating of adhesive or bonding compound, or processing such as oxidation. This procedure enables single apparatus manufacture of a two layer duct. A particular advantage is that the inner layer may be permitted to cool thus reducing loss of volatile components such as with slip enhanced MDPE.

Although the fire retardant overcoating, such as with Megolon, greatly reduces the fire hazard from polyethylene there are some circumstances, for example under vertical burning conditions, where the polyethylene may melt and manage to drip through any cracks that form in the outer coating and ignite. For this reason it is preferred to be able to manufacture a lining that is also fire retardant. It has been found that polyether imide, which chars rather than melts, will perform satisfactorily as a duct liner. The series extrusion process, first extruding a liner of polyether imide and after cooling and surface processing providing a second layer has been found particularly suitable for manufacture of polyether imide duct liners with Megolon overcoating.

In some applications it may be desired to incorporate strengtheners, such as glass strands or a mat, into the outer layer. Such strengtheners help to prevent collapse of the outer layer in fires, which is of particular importance when polyethylene inner layers are utilised to minimise escape of molten polyethylene which could ignite and spread the fire. Alternatively as a strengthening mechanism the plastics may be cross linked, a particularly convenient technique being to cross-link by electron beam irradiation, which may be performed in bulk on the fabricated duct assembly to simultaneously cross-link all layers.

A Megolon outer layer is particularly desirable for low smoke and low toxicity applications as defined by BS4066, although an equivalent material may be substituted for Megolon.

Alternative formations to ribbon strips are envisaged, for example the ducts may be arranged in a square format, albeit with loss of flexibility.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

We claim:

1. A flexible duct for optical fibre transmission lines, the duct comprising:
   an inner layer of a first polymeric material having a bore therethrough, the walls of the bore constituting means for blown fibre installation of optical fibre, and
   an outer layer of a second polymeric and fire retardant material surrounding said inner layer, wherein said first material is selected from high density polyethylene incorporating a solid lubricant, carbon loaded high density polyethylene, polyether imide or slip enhanced medium density polyethylene.

2. A duct as claimed in claim 1, wherein said second material comprises a fire retardant thermoplastic based on a polyolefin.

3. A duct as claimed in claim 2, wherein said second material comprises MEGOLON modified polyolefin.

4. A duct as claimed in claim 1, wherein said first material comprises high density polyethylene incorporating a solid lubricant.

5. A duct as claimed in claim 1, wherein said first material is carbon loaded high density polyethylene.

6. A duct as claimed in claim 5, wherein the carbon content of said first material is in the range of 5 to 10 percent.

7. A duct as claimed in claim 1, wherein said bore has a diameter of the order of 3 to 6 mm.

8. A duct as claimed in claim 7, wherein the outer diameter of said outer layer is of the order of 3 mm to 5 mm thick.

9. A multi-bore duct comprising a plurality of ducts according to claim 1, each of the ducts within said plurality being longitudinally joined to at least one other duct within said plurality.

10. A multi-bore duct as claimed in claim 9, wherein the ducts within said plurality are disposed side-by-side.

11. A multi-bore duct as claimed in claim 10, wherein adjacent ducts are longitudinally interconnected by a web to form a ribbon.

12. A multi-bore duct as claimed in claim 11, wherein the web is formed integrally with said outer layer.

13. A multi-bore duct as claimed in claim 11, wherein the web is perforated.

14. A flexible duct for optical fibre transmission lines as in claim 1 wherein:
   said inner layer comprises high density polyethylene having a bore with diameter between 3 and 6 mm therethrough suitable for fiber blowing installation, and
   said outer layer of a second polymeric and fire retardant material comprises polyolefin-based thermoplastic surrounding said inner layer.

15. A method for manufactoring a flexible duct for blown fibre installation of optical fiber transmission lines therein, said method comprising:
   extruding an inner layer of a first polymeric material having a bore therethrough, the walls of the bore constituting means for blown fiber installation of optical fibre,
   extruding an outer layer of a second polymeric and fire retardant material to surround said inner layer, wherein said first material is selected from high density polyethylene incorporating a solid lubricant, carbon loaded high density polyethylene, polyether imide or slip enhanced medium density polyethylene.

16. The method according to claim 16, wherein said inner and outer layers are coextruded in a single stage extrusion process.

17. A method according to claim 16, wherein said inner layer is extruded at a first stage and cooled, and at a second stage said outer layer is extruded over said inner layer.

18. A method according to claim 17, further comprising treating the surface of said inner layer by oxidizing or coating said inner layer with a bonding compound or adhesive to aid in adhesion of said outer layer.

* * * * *